E. B. BENHAM.
DEVICE FOR VAPORIZING OR GASIFYING HYDROCARBON LIQUIDS.
APPLICATION FILED DEC. 16, 1908.
1,047,153.
Patented Dec. 17, 1912.
2 SHEETS—SHEET 2.
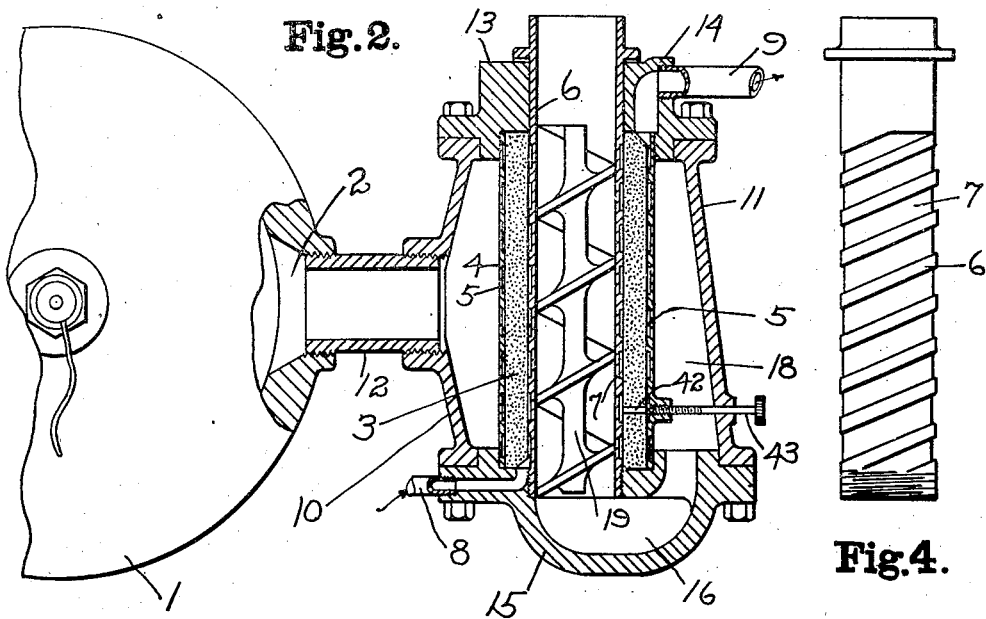
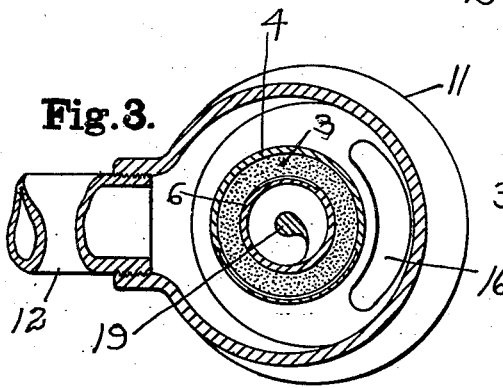
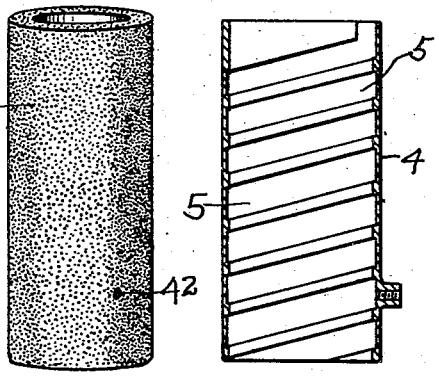
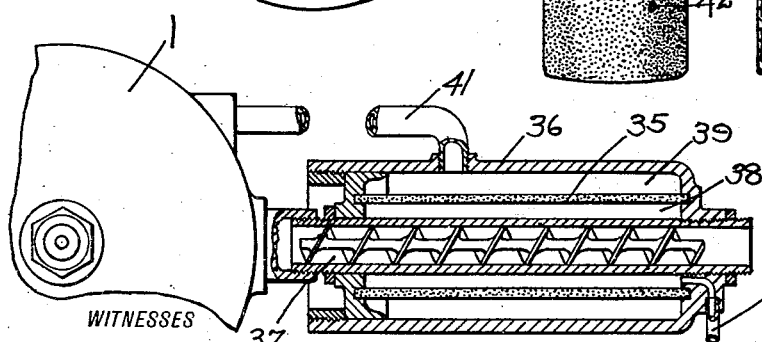
WITNESSES
Willard A. Bardeley
E. J. Ogden
INVENTOR
Elijah B. Benham.
BY Howard E. Barlow
ATTORNEY

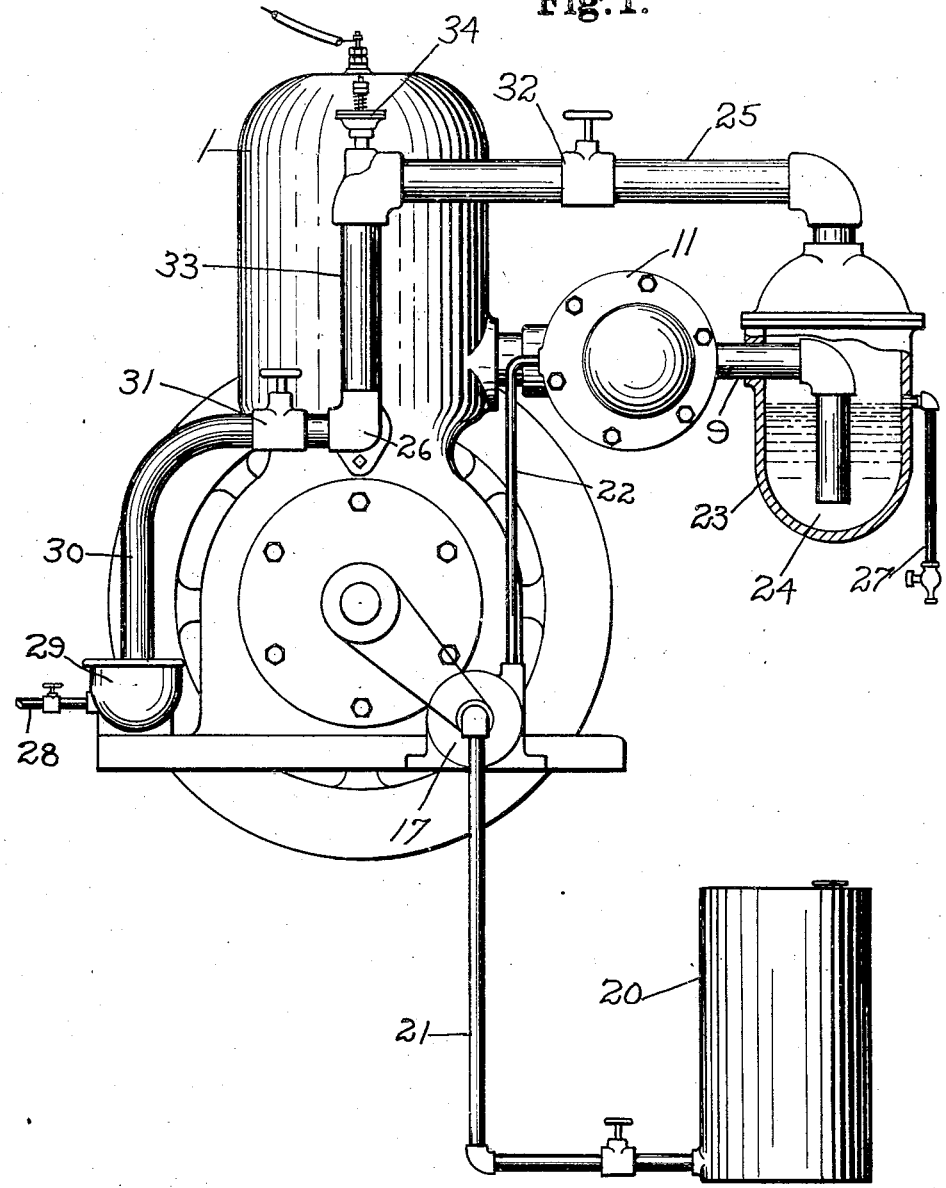

UNITED STATES PATENT OFFICE.

ELIJAH B. BENHAM, OF NEW LONDON, CONNECTICUT, ASSIGNOR TO HYDROCARBON CONVERTER COMPANY, OF NEW YORK, N. Y., A CORPORATION OF DELAWARE.

DEVICE FOR VAPORIZING OR GASIFYING HYDROCARBON LIQUIDS.

1,047,153.      Specification of Letters Patent.      Patented Dec. 17, 1912.

Application filed December 16, 1908. Serial No. 467,794.

*To all whom it may concern:*

Be it known that I, ELIJAH B. BENHAM, a citizen of the United States, residing at the city of New London, in the county of New London and State of Connecticut, have invented certain new and useful Improvements in Devices for Vaporizing or Gasifying Hydrocarbon Liquids, of which the following is a specification, reference being had therein to the accompanying drawing.

My invention relates to devices for vaporizing or gasifying hydrocarbon liquids, and embodies improvements on and modifications of the device for the same purpose illustrated and described in my Patent No. 920,903, dated May 11, 1909.

The vaporizing or gasifying devices herein illustrated and described are particularly intended for use in connection with gas engines, being intended to supply to such engines a gas or vapor adapted for use as fuel in the engine, and being intended to receive heat from the exhaust gases of such engine, which heat is utilized in the vaporization or gasification of the oil.

According to the invention of my said Patent No. 920,903, oil is converted into gas or vapor, or a mixture of the two (according to the temperature at which the apparatus is operated) by causing the oil to pass through the pores of a porous body maintained at a considerable temperature, by heat obtained by the circulation of a hot gas around the device. In the form shown in my said prior patent, the porous body has the form of a disk, and is inclosed between plates having, in their surfaces adjacent to said disk, grooves for the flow, in the one case, of the oil, and in the other case, of the gas or vapor, the said disk, with its inclosing plates, being located within a chamber through which exhaust gases from the engine pass. In the structure herein illustrated and described, the said porous body has the form of a tube or hollow cylinder, inclosed between other tubes or hollow cylinders which preferably are metallic shells, having, in the surfaces adjacent to said porous cylinder, grooves for the flow, in the one case, of the oil, and in the other case, of a gas or vapor. In order to apply the heat of the exhaust gases of an internal combustion engine to this porous tube in the most effective manner I have provided an outer chamber in which the tube with its inclosing shells is mounted. These gases are first permitted to discharge directly into this chamber thereby heating the exterior of the tube, after which the gases are caused to pass lengthwise through the tube, preferably with a circular motion from whence they are discharged into the open air. I do not restrict myself to this particular arrangement for applying the heat of the engine to this porous tubular body as the exhaust gases may be passed directly through the tube, if desired, or any suitable mean, may be employed for the utilization of the exhaust for heating this tube.

A feature of this gasifying apparatus is that the same may be readily applied to any engine of the internal combustion type with the result of greatly decreasing the cost of fuel and at the same time considerably increasing the capacity of the engine.

With these and other objects in view, the invention consists of certain novel features of construction, as will be more fully described and particularly pointed out in the appended claims.

In the accompanying drawings: Figure 1— shows a side elevation of an internal combustion engine with my oil gasifying apparatus attached thereto. Fig. 2— shows a plan view of the end of an engine cylinder and an enlarged central longitudinal section through the converter. Fig. 3— is a central transverse section through the converter. Fig. 4— represents the internal shell that lines the porous tube. Fig. 5— represents the external shell that incases the porous tube. Fig. 6— is a detail of the porous tube. Fig. 7— shows a modified form in which the exhaust gases pass in a helical channel through the center of the porous tube.

Referring to the drawings, 1 designates the cylinder of an ordinary water-cooled internal combustion engine of the two-cycle type, having a side exhaust port 2 to which exhaust is attached the gas making apparatus, as shown in Figs. 1 and 2. In this apparatus I have provided a tubular body 3, see Fig. 6, which may be constructed of pottery, unglazed porcelain, some kinds of porous metal, or other suitable porous material. This tube is preferably inclosed within a thin metallic close-fitting shell 4 which shell is preferably pressed or otherwise formed with a helical groove 5 on its internal surface. Another shell 6, preferably of thin metal, see Figs. 2 and 4, is adapted to fit closely to the inner surface of this tube. This inner shell is also provided with a helical groove 7, but the same is formed on the external surface thereof. The groove 7 in this internal shell is for the purpose of conducting the fuel, as it enters through the inlet pipe 8, first around the internal surface of the heated porous tube from one end to the other thereof, during the travel of which the fuel is caused by means of a slight pressure, caused by expansion or from the feed pump 17, to pass through the pores of this highly porous body and emerge on the opposite side in the form of a gas, which is collected by the channel 5 on the outside thereof and conveyed to the outlet opening 9.

I have shown and described the retaining shells as being provided with helical grooves, but either these shells or the tube itself may be provided with grooves, or channels, in any shape, or any other means may be provided adapted to spread the fuel over the surface of the porous tube, whereby the same is more readily acted upon by the heat to be passed through the pores in the tube and gasified. This porous tube with its internal and external shells is held within the casing 10 which may be constructed in any suitable manner, the one illustrated having a body portion 11 adapted to receive the exhaust gases direct from the engine cylinder 1 through the exhaust pipe 12. This body portion has a head 13 at one end which contains the gas outlet port 14. The head 15 at the opposite end is provided with an inlet fuel feed 8, and is also provided with an exhaust passageway 16 leading from the chamber 18, formed by the body 11, through the internal lining of the porous tube, to the outer air. In order to obtain an increased heating efficiency from the exhaust gases on the tube, a helical or screw-shaped guide 19 has been arranged in said shell so as to conduct the gases in a circular direction as they pass through the tube.

Oil is preferably supplied from the tank 20 to the decomposer under a slight pressure through pipes 21 and 22 by means of the pump 17 which is driven by the engine. The oil then enters through the channel 8 to the helical groove 7 in the interior of the tube and as said tube is heated to a comparatively high temperature by the exhaust engine gases the oil is forced through the pores in the tube 3 and is collected by the channel 5 on the opposite side and drawn off in the form of a gas through pipe 9 whence it is preferably conducted to a suitable trap, or other receptacle, 23, adapted to contain water, or other liquid 24, the gas passing off from the upper end of this chamber through pipe 25 to the inlet port of the engine at 26.

In some cases where oil fuel is forced too rapidly to the converting apparatus a small portion of liquid oil is carried through the porous body and emerges on the opposite side with the gas in the form of a refined lubricating oil. The whole is then conducted along through pipe 9 into the trap where the oil is readily separated from the gas by passing the whole through the liquid in the trap where the oil floats on the surface and may be drawn off through the drain pipe 27, whereby the lubricant necessary for running the engine is also supplied by this gasifying apparatus.

In some cases it is thought desirable to provide means for feeding a greater amount of oil through the apparatus than can be passed through the pores of the porous tube 3, and in such cases a small opening 42 is provided in said tube in order to permit a portion of the oil to pass in liquid form from the grooves 7 in the inner shell through the tube to the groove 5 in the outer shell, which opening is controlled by means of the needle valve 43 whereby the said opening may be regulated and closed entirely when desired.

Any suitable means may be employed for heating up the porous tube 3 in order to start the operation of the gas making apparatus, a convenient means being to first start the engine on gasolene, or other convenient fuels, which may be supplied from any convenient source through the pipe 28, carbureter 29 and pipe 30 to the engine. The heat from the exhaust coming in contact with the porous tube quickly heats the same up to the desired temperature, after which the valve 31 is closed shutting off the supply of gasolene, and the valve 32 is opened allowing the fuel, which has been transformed into a gas, to enter through the supply pipe 33, when the engine will continue to run and will develop much greater power on the less expensive fuel. A quantity of this gas, amply sufficient to start the engine, may be retained in the upper chamber of the trap 23, in which case no external means need be employed for heating the gas making apparatus. The quantity of air necessary for providing an explosive mixture may be admitted to the gas through the air valve 34 by the action of the engine.

A modified form of this porous tubular body is illustrated in Fig. 7 in which the porous tube 35 is held within an outer casing 36, the exhaust from the engine 1 being passed by way of a helical passage 37 through the center of said porous tube, a space 38 being left on the inside between the exhaust pipe and the porous tube whereby said tube is heated by radiation instead of by contact with the heated exhaust pipe. A space 39 is also provided on the outside between said tube and its casing 36. The fuel enters the inner chamber 38 through the supply pipe 40 where it is heated by contact with the exhaust pipe and then forced in this heated condition through the highly heated porous tube, emerging on the opposite side in chamber 39 in the form of a vapor or gas, whence it passes out through the supply pipe 41 to a suitable trap or receptacle or to the inlet port of the engine.

Having thus described my invention, what I claim as new and desire to secure by Letters Patent, is:

1. A device for gasifying or vaporizing hydrocarbon liquids, comprising a tube of porous material, other tubes of substantially impervious material arranged, the one inside of said porous tube and the other outside thereof, there being a space between each of said latter tubes and the adjacent surface of the porous tube, means for delivering liquid to be vaporized to one of said spaces, there being a discharge duct leading from the other of such spaces, and means for circulating a heating fluid in heating proximity to said tubes.

2. A device for gasifying or vaporizing hydrocarbon liquids, comprising a tube of porous material, other tubes of substantially impervious material arranged, the one inside of said porous tube, and the other outside thereof, there being a space between each of said latter tubes and the adjacent surface of the porous tube, means for delivering liquid to be vaporized to one of said spaces, there being a discharge duct leading from the other of such spaces, and means for circulating a heating fluid in heating proximity to said tubes, comprising means for passing such heating fluid through the interior of the innermost tube.

3. A device for gasifying or vaporizing hydrocarbon liquids, comprising a tube of porous material, other tubes of substantially impervious material arranged, the one inside of said porous tube, and the other outside thereof, there being a space between each of said latter tubes and the adjacent surface of the porous tube, means for delivering liquid to be vaporized to one of said spaces, there being a discharge duct leading from the other of such spaces, and means for circulating a heating fluid in heating proximity to said tubes, comprising means for passing such heating fluid through the interior of the innermost tube, and means for retarding flow of such heating fluid through such innermost tube.

4. A device for gasifying or vaporizing hydrocarbon liquids, comprising a tube of porous material, other tubes of substantially impervious material arranged, the one inside of said porous tube and the other outside thereof, there being a space between each of said latter tubes and the adjacent surface of the porous tube, means for delivering liquid to be vaporized to one of said spaces, there being a discharge duct leading from the other of such spaces, and means for circulating a heating fluid in heating proximity to said tubes, comprising means for passing such heating fluid through the interior of the innermost tube, and a helical divider within said innermost tube dividing the interior thereof into a helical passage for the flow of such heating fluid.

5. A device for gasifying or vaporizing hydrocarbon liquids, comprising a tube of porous material, other tubes of substantially impervious material arranged, the one inside of said porous tube, and the other outside thereof, there being a space between each of said latter tubes and the adjacent surface of the porous tube, means for delivering liquid to be vaporized to one of said spaces, there being a discharge duct leading from the other of such spaces, and means for circulating a heating fluid in heating proximity to said tubes, comprising a casing surrounding said tubes and inclosing between its walls and the outermost of said tubes a space for the circulation of heating fluid, said casing provided with a duct connecting such space with the interior of the inner tube.

6. A device for gasifying or vaporizing hydrocarbon liquids, comprising a main shell or casing consisting of an intermediate casing member and heads therefor, a gasifying or vaporizing structure within such casing comprising two cylinders of substantially impervious material mounted in the heads of said casing and spaced apart from each other and from the lateral walls of the casing, and a cylinder of porous material between said cylinders of impervious material, there being a space between each such cylinder of impervious material and the cylinder of porous material, means for supplying liquid to be vaporized or gasified to one of such spaces, and means for carrying away gas or vapor from the other of such spaces.

7. A device for gasifying or vaporizing hydrocarbon liquids, comprising a main shell or casing consisting of an intermediate casing member and heads therefor, a gasifying or vaporizing structure within such casing comprising two cylinders of substantially impervious material mounted in the heads of said casing and spaced apart from each other and from the lateral walls of the casing, and a cylinder of porous material between said cylinders of impervious material, there being a space between each such cylinder of impervious material and the cylinder of porous material, means for supplying liquid to be vaporized or gasified to one of such spaces, and means for carrying away gas or vapor from the other of such spaces, one of the heads of said casing being provided with a duct connecting the space surrounding the outermost of said cylinders with the interior of the innermost of said cylinders.

8. A device for gasifying or vaporizing hydrocarbon liquids, comprising a main shell or casing consisting of an intermediate casing member and heads therefor, a gasifying or vaporizing structure within such casing comprising two cylinders of substantially impervious material mounted in the heads of said casing and spaced apart from each other and from the lateral walls of the casing, and a cylinder of porous material between said cylinders of impervious material, there being a space between each such cylinder of impervious material and the cylinder of porous material, means for supplying liquid to be vaporized or gasified to one of such spaces, and means for carrying away gas or vapor from the other of such spaces, one of the heads of said casing being provided with a duct connecting the space surrounding the outermost of said cylinders with the interior of the innermost of said cylinders, said innermost cylinder passing through the other head of said casing and thereby affording a discharge opening for the heating fluid.

9. A device for gasifying or vaporizing hydrocarbon liquids, comprising a hollow cylinder of porous material and two cylinders of substantially impervious material, one inside of and one outside of such porous cylinder, the said impervious cylinders provided with helical passages in their faces adjacent to said porous cylinder, an inlet duct connecting with one such passage, an outlet duct connecting with the other such passage, and means for applying heat to said porous cylinder.

10. A gas making apparatus, consisting of a porous cylinder having passageways around its exterior and inner faces formed of grooved metal cylinders whose grooves are opposite each other on opposite sides of the walls of the porous cylinder and which grooved cylinders touch the walls of the porous cylinder between the grooves, said cylinders being adapted to be heated and having inlet and outlet openings for the passageways.

In testimony whereof I affix my signature in presence of two witnesses.

ELIJAH B. BENHAM.

Witnesses:
   WM. T. CUTTER,
   HOWARD E. BARLOW.